June 30, 1959 P. A. FRANCOIS 2,892,659
AGRICULTURAL SEMI-TRAILERS
Filed May 17, 1954 3 Sheets-Sheet 1

INVENTOR
PAUL AUGUSTIN
FRANCOIS

June 30, 1959 P. A. FRANCOIS 2,892,659
AGRICULTURAL SEMI-TRAILERS
Filed May 17, 1954 3 Sheets-Sheet 2

INVENTOR.
PAUL AUGUSTIN
FRANCOIS
By
ATTORNEY

June 30, 1959   P. A. FRANCOIS   2,892,659
AGRICULTURAL SEMI-TRAILERS

Filed May 17, 1954   3 Sheets-Sheet 3

INVENTOR
PAUL AUGUSTIN
FRANCOIS
By
ATTORNEY

United States Patent Office 2,892,659
Patented June 30, 1959

2,892,659

AGRICULTURAL SEMI-TRAILERS

Paul Augustin François, Miraumont, France

Application May 17, 1954, Serial No. 430,357

Claims priority, application France October 8, 1953

4 Claims. (Cl. 298—22)

This invention relates to new and improved means to connect two vehicles in general and to adjustably connecting coupling means between a towing vehicle and a trailer, for example between an agricultural tractor and a semi-trailer.

It is known that it is not always easy to couple a trailer or a semi-trailer to a tractor or any other towing vehicle, particularly when the trailer is loaded, because the height of the coupling elements of the trailer and of the tractor is different in most cases. Devices have been designed to overcome this inconvenience but these designs provide merely for lifting jacks or windlasses to lift the entire trailer and are not too practical on uneven ground.

This invention has the purpose to provide for means to overcome these difficulties. Objects and advantages of the invention will be set forth in part hereafter and in part will be obvious herefrom or may be learned by practicing the invention, the same being realized and attained by means of the instrumentalities and combinations pointed out in the appended claims.

It is a general object of this invention to provide for new connecting means between a towing vehicle and a trailer which facilitates the coupling and uncoupling of the two vehicles.

Another object of the present invention is to provide for a coupling means which comprises an expanding member by which the position of at least one part of the coupling means may be adjusted to the position of the other.

A further object of the invention is to provide for a coupling means which is arranged in such way and which is combined with an expanding member so that said expanding member is protected and does not bear on the ground during the adjusting operation.

Another object of the invention is to provide for a connecting means for coupling or uncoupling a trailer to a towing vehicle automatically, disregarding a possible difference in height of the two vehicles.

A still further object of this invention is to provide for a coupling means which can be operated safely and conveniently.

Furthermore, it is an object of this invention to provide for connecting means for coupling two vehicles with connecting means which are simple in construction, uncomplicated and sturdy in design and which can be manufactured easily and economically.

Various further and more specific purposes, features and advantages will clearly appear from the detailed description given below taken in connection with the accompanying drawings which form part of this specification and illustrate merely by way of example one embodiment of the device of the invention.

The invention consists in such novel features, arrangements and combinations of parts as may be shown and described in connection with the apparatus herein disclosed by way of example only and as illustrative of a preferred embodiment.

In the following description and in the claims, parts will be identified by specific names for convenience, but such names are intended to be as generic in their application to similar parts as the art will permit. Like characters given for reference denote like parts in the several figures of the drawings.

Referring now to the drawings.

Figure 1:
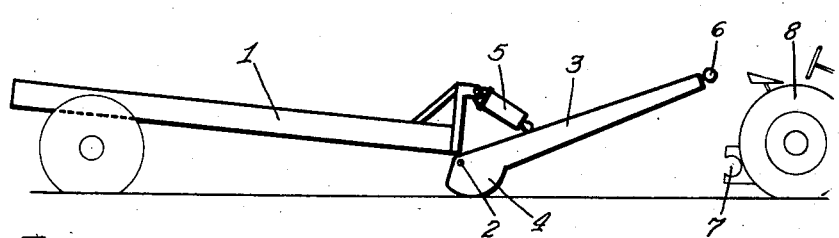
Fig. 1 illustrates a semi-trailer to which the invention is applied, resting on the ground.
Figure 2:
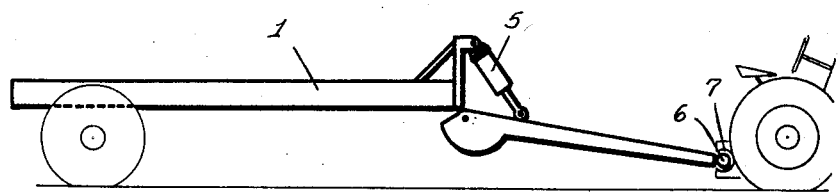
Fig. 2 illustrates said semi-trailer connected to a tractor through coupling means according to the invention.
Figure 3:
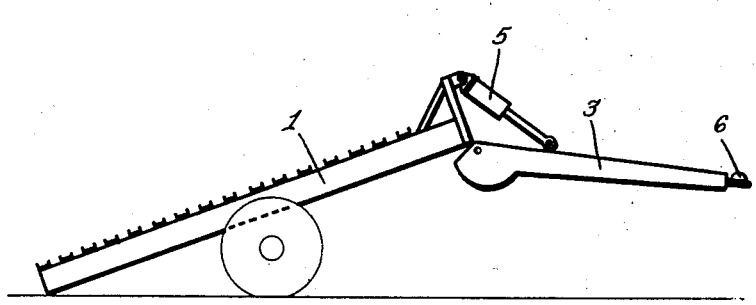
Fig. 3 illustrates another type of trailer seen in a partly tilted position to which the invention is applied.

Referring now in more detail to the drawings illustrating a preferred embodiment by which the invention may be realized, the vehicle to be towed, for instance a semi-trailer 1 has an arm 3 attached to its front side which can swing vertically about a pivot 2 held on the front side of said trailer 1. On the front end of said arm 3 there is a coupling means 6, which may consist of a ball or a hook or a ring or the like. This coupling means in turn fits into a corresponding socket member 7 which belongs to the towing vehicle 8. On the rear end of said arm 3 which is pivotally connected to the front side of the semi-trailer 1 or the like, there is an arcuate portion 4 extending downwardly to the ground providing for support of the vehicle 1 when it is not coupled to towing vehicle 8. An expanding means 5, or a plurality thereof, which may consist of a hydraulic cylinder, a jack, a windlass or the like, is attached with one end to the front side of the vehicle 1 to be towed and with the other end to the arm 3. Thus, said arm 3 may be lifted or lowered by operating the expanding means 5 either by hand or by any suitable power supply derived from the engine of the towing vehicle 8. It is easy to understand that a coupling or uncoupling operation can become automatic disregarding the height of the coupling members relative to another.

Figure 4:
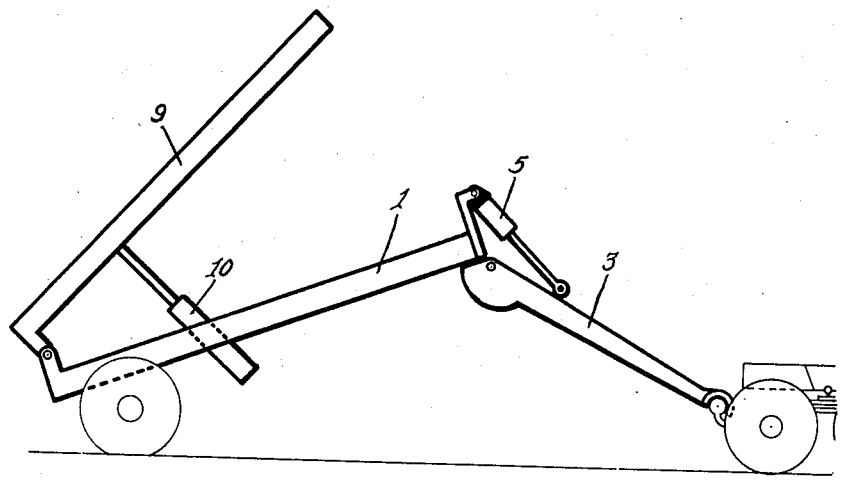
Fig. 4 shows a trailer in a completely tilted position.

If the vehicle to be towed is of the dump trailer type, as it is illustrated in Fig. 4, having its hydraulic tilting means 10 for tilting its bottom upwardly, it becomes possible to tilt the vehicle 1a and it bottom 9 simultaneously faster and at a higher angle than usually obtainable by heretofore known means, permitting a faster unloading of the dump trailer.

Figure 5:
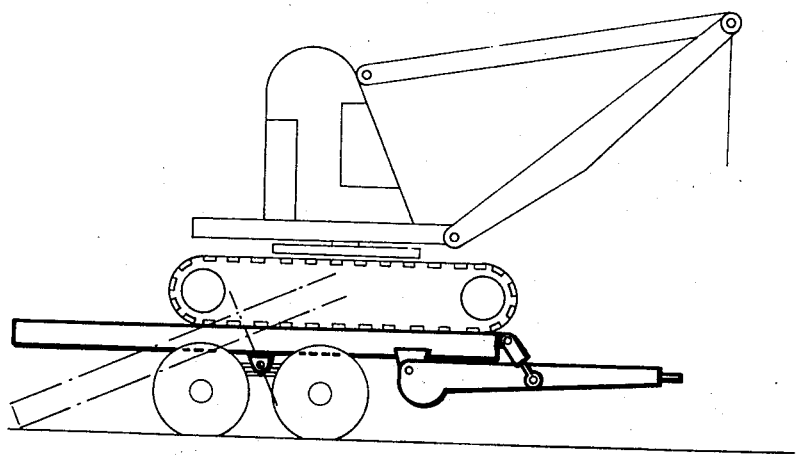
Fig. 5 shows a trailer with a load disposed in horizontal position.
Figure 6:
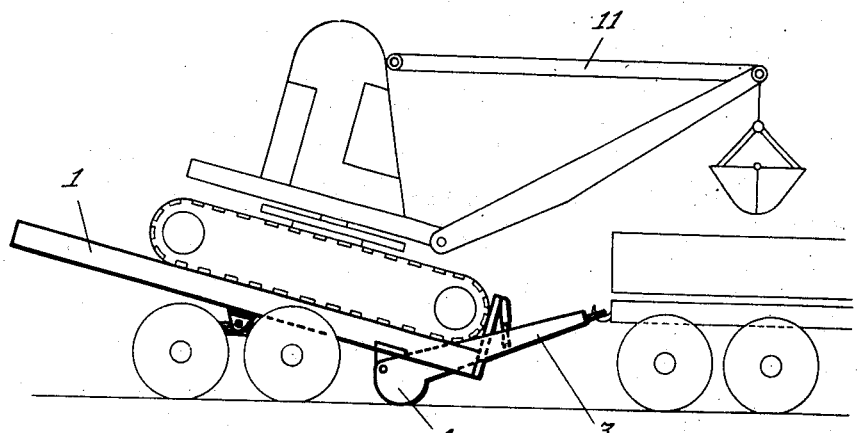
Fig. 6 is the trailer shown in Fig. 5 in a tilted position.
Figure 7:
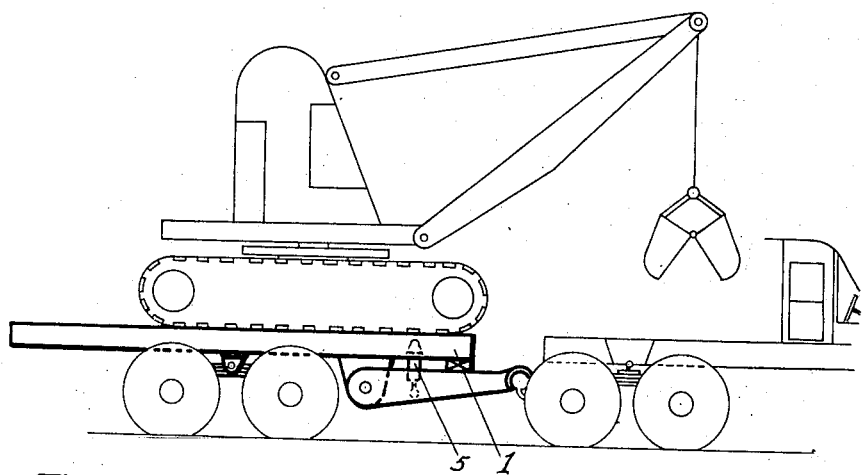
Fig. 7 illustrates a trailer having a different arrangement of the connecting means according to the invention.

In Figs. 5, 6 and 7 there is disclosed another type of a trailer 13, illustrating how a high and bulky load 12 having extending parts 11 may be leveled and help the vehicle cross under bridges or through tunnels. By merely changing the position of the expanding means 5 as it is disclosed in Fig. 7, the device may also be used to transfer a major part of the load of the trailer to the end of the towing vehicle thus increasing the traction of the driving wheels and relieving the trailer axle.

While the invention has been described and illustrated with respect to a certain particular preferred example which gives satisfactory results, it will be understood by those skilled in the art after understanding the principle of the invention, that various changes and modifications may be made without departing from the spirit and scope of the invention and it is intended therefore in the appended claims to cover all such changes and modifications.

I claim:

1. Connecting means for coupling a tiltable trailer with a towing vehicle, comprising, a coupling member connected to said vehicle, a movable arm hingedly connected at one end to said trailer and at its other end carrying a complementary coupling member engageable with said first mentioned coupling member, said hinged end having a downwardly extending integral portion, an expandable device connected to said trailer and said movable arm whereby said arm and said trailer are adapted to be tilted relatively to said vehicle, in response to said expanding device, when said expanding device is being operated to first engage together said coupling members and then by further movement raise the said one end of said trailer and said arm.

2. Connecting means for coupling a tiltable trailer including a tiltable platform with a towing vehicle, comprising a coupling member connected to said vehicle, a movable arm hingedly connected at one end to said trailer and at its other end carrying a complementary coupling member engageable with said first mentioned coupling member, said hinged end having a downwardly extending integral arched member, a first expandable device connected to said trailer and said movable arm whereby said arm and said trailer are adapted to be tilted relatively to said vehicle, in response to said expanding device when said expanding device is being operated to first engage together said coupling members, and a second expandable device connected to said trailer and platform, said device being adapted to cause said platform to become tilted relative to said trailer to increase the angle of tilting relative to ground.

3. Connecting means according to claim 2 and wherein said expandable devices are hydraulic jacks.

4. Connecting means for coupling a trailer including a tipping platform centrally supportable with a towing vehicle, comprising, a coupling member connected to vehicle, a movable arm hingedly connected at one end to said trailer at a point intermediate the trailer frontal portion and at its other end carrying a complementary coupling member engageable with said first mentioned coupling member, said hinged end having a downwardly extending integral arched member, an expandable device connected to said trailer and said movable arm whereby said arm and said trailer platform are adapted to be tilted relatively to said vehicle, in response to said expanding device, when said expanding device is being operated to first engage together said coupling members.

References Cited in the file of this patent

UNITED STATES PATENTS

| | | |
|---|---|---|
| 2,027,127 | Tastenhoye | Jan. 7, 1936 |
| 2,219,585 | Begin | Oct. 29, 1940 |
| 2,309,766 | Harroun et al. | Feb. 2, 1943 |
| 2,316,702 | McDaniel | Apr. 13, 1943 |
| 2,469,199 | Lewis | May 3, 1949 |
| 2,496,515 | Bayes | Feb. 7, 1950 |
| 2,628,126 | Black | Feb. 10, 1953 |

FOREIGN PATENTS

| | | |
|---|---|---|
| 760,730 | France | Dec. 27, 1933 |